(No Model.)

G. P. HART.
STOP HINGE.

No. 491,645. Patented Feb. 14, 1893.

Witnesses,
Brayton S. Lewis,
C. Darwin Loomis Jr.

Inventor,
George P. Hart
By James Shepard
Atty.

UNITED STATES PATENT OFFICE.

GEORGE P. HART, OF NEW BRITAIN, CONNECTICUT.

STOP-HINGE.

SPECIFICATION forming part of Letters Patent No. 491,645, dated February 14, 1893.

Application filed June 8, 1892. Serial No. 435,964. (No model.)

*To all whom it may concern:*

Be it known that I, GEORGE P. HART, a citizen of the United States, residing at New Britain, in the county of Hartford and State of Connecticut, have invented certain new Improvements in Stop-Hinges, of which the following is a specification.

My invention relates to improvements in stop hinges, and the main object of my improvement is simplicity and economy of construction.

Figure 1:
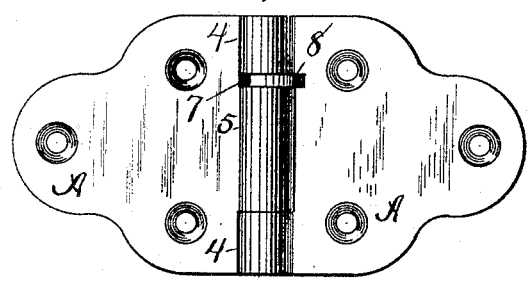
Figure 2:
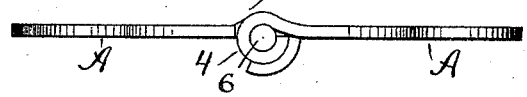
Figure 3:

In the accompanying drawings, Figure 1 is a front elevation of my hinge. Fig. 2 is a plan view of the same, and Fig. 3 is a detached plan view of the stop washer.

The leaves A A may be of any ordinary form and construction, the same being connected together by ordinary knuckles 4 and 5 and a pintle 6, but I make a space between the ends of two adjoining knuckles equal to the thickness of the stop washer to be used therewith. I form this washer with a hole in it of the right size to receive the pintle and with the main portion of its body 7 in circular form and of the same size as the knuckles 4 and 5 of the hinge. I also provide this washer with a stop wing 8. I preferably form the outer edge of this wing on a circle of a little greater radius than the circle of the knuckles whereby there is a radial shoulder at each end of the wing and these may be varied in distance from each other as occasion may require. After having constructed the several parts in the manner described, the knuckles of the two leaves are placed together and the body of the stop washer inserted in the space provided for it within the knuckles after which the pintle is driven through the knuckles and stop washer to complete the hinge. The stop washer lies loosely on the pintle, free to swing in either direction, and it is evident that the stop wing on the inside of the leaves will prevent the leaves from being turned toward each other beyond a certain limit, which limit may be varied as may be desired by making the ends of the stop wing nearer together or farther apart. The shoulders at each end of the wing being radial come in contact with the ordinary faces of the hinge leaves, thereby avoiding the necessity of forming special stop shoulders or faces on the leaves. This construction is cheap, simple and efficient. It is of course evident that if desired, a like stop washer might be placed between the confronting ends of the other knuckles as this would involve only a duplication of the construction hereinbefore described. It is also evident that the location of the stop washer at any particular point is not essential as it is only necessary to provide a suitable space to receive it at some point within the length of all the knuckles where its wing will stop the leaves in the manner herein described.

I am aware that a prior patent shows a stop hinge consisting of leaves constructed with special stop shoulders, a pintle, and a disk secured thereto having two angular projections with tangential stop faces and the same is hereby disclaimed.

I claim as my invention—

The herein described stop hinge consisting of leaves, knuckles, and pintle, the flat inner faces of the leaves being substantially radial, and the winged stop washer mounted on the pintle and having radial stop shoulders for interposition between and engagement with said radial faces of said leaves, substantially as described and for the purpose specified.

GEORGE P. HART.

Witnesses:
H. B. HUMASON,
G. L. REYNOLDS.